Oct. 21, 1941.  E. J. HOUDRY  2,259,469
REFINING OF NAPHTHA
Filed Aug. 20, 1937
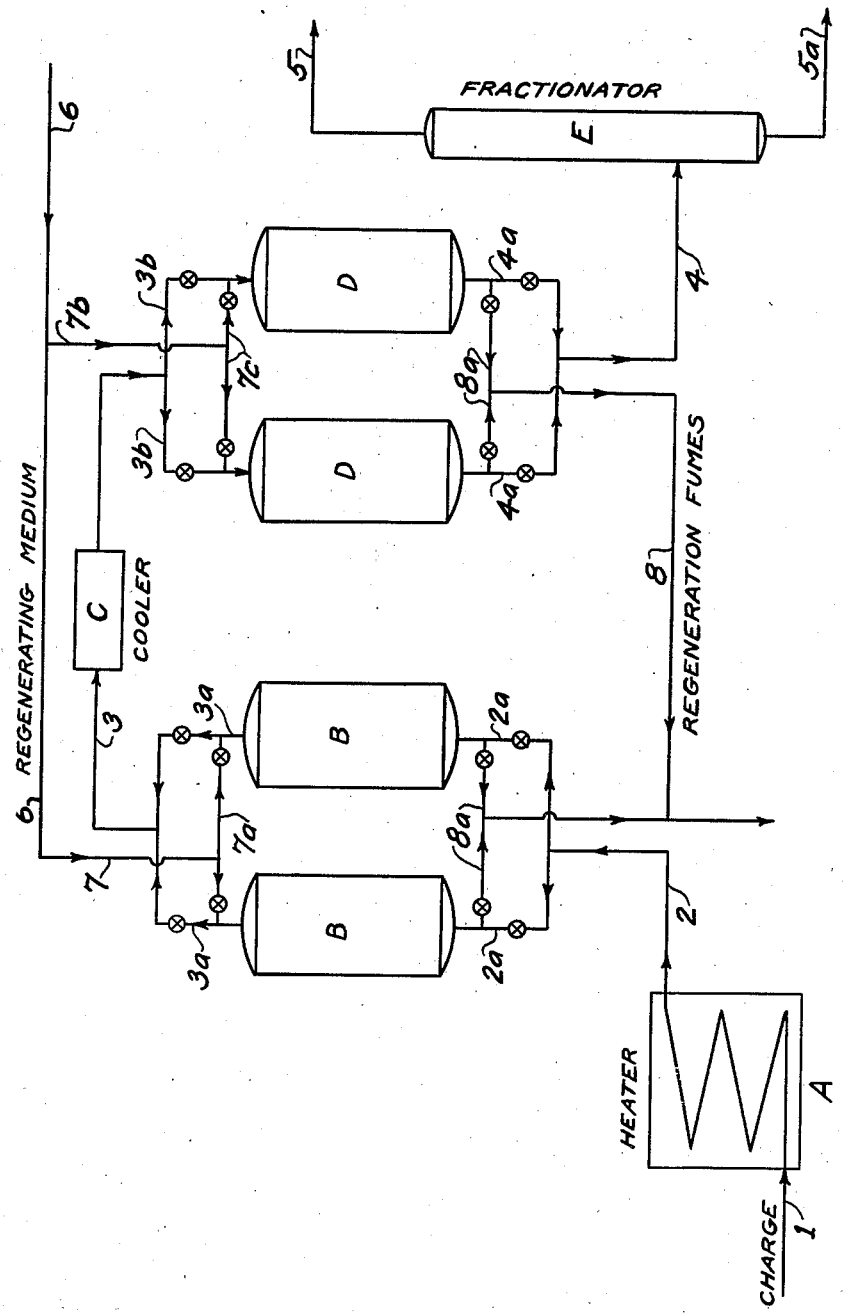
INVENTOR
EUGENE J. HOUDRY
BY
*Ira L. Nickerson*
ATTORNEY Patented Oct. 21, 1941

2,259,469

UNITED STATES PATENT OFFICE 2,259,469

REFINING OF NAPHTHA

Eugene J. Houdry, Haverford, Pa., assignor to Houdry Process Corporation, Wilmington, Del., a corporation of Delaware Application August 20, 1937, Serial No. 160,059

4 Claims. (Cl. 196—28)

The present invention relates to the treatment of hydrocarbons. More particularly, it is concerned with the purification of lower boiling hydrocarbons, including naphthas intended for use as motor fuels, illuminating oils, solvents and the like, which may be contained in or derived from petroleum, coal, peat, shale, etc. It is directed particularly toward a process utilizing contact or catalytic material for refining such lower boiling hydrocarbons containing large amounts of sulphur or sulphur bearing material.

Reduction of the sulphur content of lower boiling hydrocarbons to produce marketable stocks which are non-corrosive or lack to sufficient degree the low anti-knock, gum-forming, wick encrusting, and other undesirable properties caused by sulphur and its compounds has long been a problem of major importance to refiners. Removal of easily removable sulphur has been effected by various methods known to the industry, including treatment of the naphtha with one or more chemical reagents and the use of metals or metal oxides capable of removing and retaining sulphur and certain types of sulphur compounds. In many instances, when the naphtha had a high sulphur content, and particularly in refractory organic form, as in aromatic or naphthenic compounds, it was either impossible or extremely expensive to effect substantial reduction of the sulphur content of the naphtha. In such instances, an approach to the desired object was gained at the cost of large quantities of expensive chemicals, of desirable properties of the naphtha, including anti-knock rating, and/or of substantially reduced yield of the desired product.

In U. S. Patent No. 2,078,247, issued to me on April 27, 1937, and in my copending application Serial No. 71,341, filed March 27, 1936, there are disclosed processes for transforming higher boiling hydrocarbons into lower boiling hydrocarbons and subsequently refining and chemically stabilizing the latter. The transformation step in each of these processes involves the use of a contact mass having selective adsorptive properties capable of promoting the desired transformations concurrently with the production of gas and coke. It is a feature of the transformation process set forth in the above mentioned patent and copending application that, regardless of the nature and amount of organic sulphurous components in the original higher boiling charge, the sulphur in such components is, simultaneously with the production of the desired lower boiling hydrocarbons, transformed into inorganic or easily removable form, chiefly hydrogen sulphide, and is then removed in the subsequent refining operation.

One object of the present invention is to effect substantial reduction in the sulphur content of high sulphur naphthas without substantial loss and without detriment to desirable properties of the naphthas. Another object is, simultaneously with the sulphur removal, to generally improve desirable properties of the naphthas, including color and stability. Other objects will be apparent from the detailed discussion which follows.

The accompanying drawing indicates somewhat diagrammatically one arrangement of a plant for practising the invention.

The invention involves a two stage treatment of naphthas in serially arranged reaction zones maintained at progressively lower temperatures. The naphtha is charged in vapor phase to the first of these zones, wherein difficulty removable or organic sulphur compounds are selectively and preferentially transformed or converted into easily removable or inorganic form to substantially complete exclusion of transformations of the type wherein sweet and stable or pure hydrocarbons take part to be transformed or depreciated. In fact, the net result of the chemical processes effected within the first zone is general improvement of the naphtha, including removal of existing and potential gum and color forming bodies, which result is realized at the cost of substantially no loss of the charge to undesirable by-products such as coke and gas, excepting a small amount of such by-products produced as a direct result of the selective transformation of sulphur bearing and other undesirable compounds. The selectively transformed naphtha leaving this zone is charged at lower temperature to the second zone wherein the easily removable sulphurous components are removed, preferably along with any remaining or potential gum or color bodies. The naphtha leaving the second reaction zone, after adjustment of boiling range by fractionation, if necessary, will meet market specifications for high quality motor fuels, illuminating oils, solvents or the like.

Operating conditions of the initial reaction zone are, in some respects, critical. It contains a contact mass having selective adsorptive properties capable of promoting transformation of high boiling hydrocarbons into products having a lower boiling range and/or different molecular structure. The important discovery has been made that, when using contact masses having the above described properties under temperature and other conditions favorable for substantial transformation or decomposition of a high boiling charge into products of changed form, the use of judiciously chosen charging rates of high sulphur content naphtha results in directing their activity substantially solely to the selective transformation of organic sulphur bearing and other undesirable components. Such charging rates are above those suitable for decomposition at the operating temperature of substantial amounts of the sweet and stable components (pure hydrocarbons) of the naphtha with attendant production of gas and coke. The rate or range of rates giving the best results for any particular naphtha may vary within wide limits and is dependent upon the characteristics of the naphtha.

In general, the form and ease of decomposition of the organic sulphur components of a high sulphur naphtha parallel the type or types of hydrocarbons predominating within the naphtha and the ease of decomposition of such hydrocarbons. For example, in a high sulphur naphtha comprised to substantial extent of aromatic or naphthenic hydrocarbons, the organic sulphur content is in the form of aromatic or naphthenic sulphides which are more refractory than aliphatic sulphides and/or mercaptans which appear in naphthas of predominantly aliphatic nature. In practising the invention, higher charging rates to the first reaction zone are required for stocks of an aliphatic nature, as exemplified by straight run distillates from many paraffinic or mixed base crudes, than for the more refractory so-called pressure distillates containing substantial amounts of ring compounds and resulting, for example, from thermal cracking or reforming processes.

The catalyst may be any contact mass having selective adsorptive properties capable of effecting transformation of hydrocarbons to substantial extent and is usually comprised essentially or predominantly of highly adsorption material of a silicious nature and preferably a blend of silica and another oxide having a molecular arrangement providing interfacial characteristics which impart a high degree of catalytic activity to the blend. Good results are usually obtained from adsorptive blends of silica and alumina of natural or artificial origin, as, for example, activated hydrosilicates of alumina including those containing silica and alumina in the weight ratio of at least 4 to 1, as disclosed for example, in U. S. Patent No. 2,078,945, issued to me on May 4, 1937, or gels, or gel-like mixtures of silica and alumina, resulting, for example, from the interreaction of solutions of a soluble silicate and a soluble aluminum salt.

With most high sulphur naphthas and most silicious contact masses having the desired selective adsorptive properties, satisfactory results are obtained when the first reaction zone is maintained at a temperature within the range of 750° to 875° F., while preferential temperatures for adsorptive blends of silica and alumina are usually of the order of 800° to 825° F. Feed rates suitable for the selective transformation of undesirable components of the charge are, in most instances, at least one volume of liquid charge per hour to each volume of contact mass and may be as high as fifteen times this rate. The more refractory naphthas are usually effectively transformed according to the invention when fed to the initial reaction zone at rates within the lower portions of the aforesaid range, as, for example, up to ten volumes of liquid charge per hour per volume of contact mass. When pressure distillates are used, the tendency is toward lower rates within the restricted range, the more drastic the thermal cracking conditions utilized in the previous processing of the naptha. Charging stocks of less refractory nature, as occur in many straight run naphthas from petroleum, may advantageously be transformed when fed to the initial reaction zone at rates above two or three volumes per hour per unit volume of catalyst.

In many instances, the selectively transformed vapors leaving the first reaction zone need only extraction of the easily removed sulphur, which is usually predominantly in the form of hydrogen sulphide with possibly some comparatively low boiling mercaptans, to produce an end material capable of meeting market specifications for purity. In such cases, the second treatment may simply comprise a suitable chemical treatment for removing such sulphur, as, for example, a caustic wash. More complete sulphur removal and/or economies of process are usually realized, however, when the second treatment comprises removal and retention of the transformed sulphur from the products of the first reaction zone by the action of a contact mass comprising or containing a metal or metal oxide capable of effecting such sulphur removal. Preferably, this second contact mass comprises any suitable or desirable amount of one or more easily reducible metals or metal oxides in finely divided form distributed evenly throughout or incorporated with a porous support, as, for example, up to 20% by weight of one or more metals from the group, nickel, copper, cobalt, iron, in the form of finely divided oxide dispersed uniformly through a porous silicious support. When it is desired, in addition to effecting sulphur removal, to further improve the stability of the charge to the second reaction zone, such support preferably has selective adsorptive properties, and may be, for example, an active blend of silica and alumina of the type suitable for use in the first reaction zone.

The second contact mass performs to best advantage when maintained at a temperature within the range of 400° to 650° F., with a preferential range of 450° to 600° F., within which most partially transformed naphthas are susceptible of the required amount of purification to produce the desired high quality material. Suitable charging rates to the second reaction zone vary within wide limits and may be, for example, from one to fifteen volumes of selectively transformed product (calculated as liquid) per hour per volume of contact mass, selection of the best rate or range of rates for any particular charging stock depending largely upon the concentration of hydrogen sulphide in the selectively transformed naphtha and the percentage of metal in the contact mass, the tendency being toward lower rates within the above range with larger quantities of hydrogen sulphide and/or with smaller percentages of metal, and vice versa.

If desired, the charge to either or both of the catalytic reaction zones may have a suitable inert diluent fluid admixed therewith to act as a carrier for the vaporized charge and to assist in controlling the characteristics of the adsorption and diffusion processes of the charge and reaction products into and from the adsorptive contact mass or masses. One good diluent is steam, which may be used in any desirable amount, as up to 20% by weight of the charge to each zone. Equivalent amounts of other diluents, such as refinery gases, may be substituted for steam. The refining process comprising the invention may be conducted with satisfactory results at any convenient operating pressure. In practice, it is usually desirable to maintain comparatively low pressures, as, for example, up to 60 or 75 pounds per square inch, gauge. If pressures above these are used, however, it may be necessary, in order to compensate for tendencies of increased contact time of hydrocarbons and catalyst in the initial reaction zone to promote undesirable side reactions, to adjust the contact time as by suitable manipulation of the steam content and/or rate of feed of the fresh charge.

The contact masses utilized in the catalytic reaction zone or zones gradually lose their activity with use, and may be periodically regenerated, preferably in situ, to restore such activity, as by controlled combustion of the deposits accumulated thereon so that each contact mass may be used alternately on-stream and in regeneration. Such regenerations may take place after any desired on-stream or operating period, but the most favorable economics of the process are usually presented when the on-stream periods do not exceed about two hours, being, for example, of about an hour's duration, or, preferably, even shorter, as from ten minutes to about a half hour in length. The regeneration periods are kept as short as possible in order to restrict to a minimum time the unproductive portion of the operating cycle. To this end, each contact mass is preferably in the form of molded or broken pieces of substantially uniform size and shape, after the manner described in the above mentioned United States Patent No. 2,078,945, and, in order to speed the regeneration of the contact mass in the first reaction zone, that catalyst may contain a small amount of an oxidation promoter, as, for example, about 1% by weight of manganese in the form of an oxide, as disclosed in United States Patent No. 2,078,951, issued to me May 4, 1937. Such use of a small amount of oxidation promoter has practically no effect on the transforming activity of the contact mass.

The following typical examples illustrate the invention:

Example 1

A motor fuel derived from a thermal cracking operation and comprising a 410° F. end point distillate having a sulphur content of approximately 0.2%, a C. F. R. octane of about 67, and an A. P. I. color of 10 was vaporized, and, along with about 5% of its weight of steam, fed, under a pressure of about 30 lbs. per square inch, gauge, and at a rate of about 7 volumes of liquid charge per hour per volume of contact mass, to a reaction zone containing an activated hydrosilicate of alumina containing silica and alumina in the weight ratio of about 4:1 and maintained at a temperature of about 800° F. After an operating period of about 15 minutes, the charge was stopped, the condensed product of the operation collected, fractionated to remove a small amount of polymers, subjected to a light caustic wash, and then examined. This product, having an end point of about 412° F. and representing about 96.5% of the volume of the original naphtha, was found to have a C. F. R. octane of about 70, a sulphur content of approximately 0.08%, and an A. P. I. color of the order of 26.

Example 2

A pressure distillate from a thermal cracking operation, having an end point of approximately 400° F., a C. F. R. octane rating of about 61, an A. P. I. color of about 7, and a sulphur content of the order of 0.3%, was vaporized and fed, at a rate of 10 volumes of liquid charge per hour per volume of contact mass, and under a pressure of about 30 lbs. per square inch, gauge, to a reaction zone containing a catalyst similar to that used in Example 1, and maintained at a temperature of about 805° F. The vapors issuing from the reaction zone were cooled and fed at a rate of about 4 volumes of charge (calculated as liquid) per hour per volume of contact mass, to a second reaction zone containing an adsorptive blend of silica and alumina having approximately 10% Ni incorporated therewith and maintained at a temperature of the order of 600° F. The product issuing from the second zone was fractionated to obtain a 400° F. end point material and, after an operating period of about thirty minutes, this product was collected and examined. It was found to represent about 96% by volume of the original charge, had an octane rating of about 63, an A. P. I. color of about 26, a sulphur content of approximately 0.13%, was non-corrosive as determined by the copper strip method, was sweet to the doctor test, and had a copper dish gum content of about 3 mg.

The apparatus necessary for practising the invention, as indicated in the accompanying drawing, is simple and persons skilled in the art will be capable of arranging the same in a manner to effect a satisfactory operation. It may comprise: a heating device of any known or desired type such as tube still A to which fresh charge is admitted by line 1; one or more converters B providing reaction chambers, preferably a plurality of converters selectively connected to said heating means by transfer line 2 and valved branches 2a, each converter being arranged and adapted, in known manner, for use alternately on-stream and in regeneration, regenerating medium being supplied by lines 6 and 7 and valved branches 7a while regeneration fumes are discharged from the converters by valved branches 8a; suitable cooling means C disposed in discharge line 3 selectively connected to each of said converters by valved branches 3a; if a second catalytic zone is used, there may be a second battery of converters D following the cooling means and selectively connected to line 3 by valved branches 3b, with, permissibly, a fractionator E provided with an overhead outlet 5 for the finished naphtha and a bottoms outlet 5a for polymers separated therefrom following and selectively connected to said second converters by valved branches 4a and line 4, or, if a chemical treatment be used as the second treating stage, known treating equipment may follow the cooler in place of the second battery of converters. Regenerating medium for use in converters D may be conducted to them as desired or required by line 7b and valved branches 7c while regeneration fumes may discharge from valved branches 8a into line 8 to be ejected from the system. Converters suitable for use in practising the invention may be any one of several types and may provide one or more reaction chambers containing the catalyst arranged in one or more beds or layers, and may be adapted for straight through passage of the reactants through such bed or beds, after the manner disclosed, for example, in my copending application Serial No. 157,475, filed August 5, 1937 (Patent No. 2,161,677, issued June 6, 1939), or reactants may be distributed through and/or reaction products vented from a plurality or multiplicity of points within the contact mass through the use of one or more series of inlet and/or outlet members embedded in the contact mass, as shown, for example, in U. S. Patent No. 1,987,904, issued to me January 15, 1935, and U. S. Patent No. 2,042,468, issued to me June 2, 1936. If desired, suitable heat exchange means may be associated with the contact mass to control the temperature thereof during on-stream and/or regenerating periods, as illustrated, for example, in my aforesaid copending application Serial No. 157,475, in my copending aplications Serial No. 157,680, filed August 6, 1937 (Patent No. 2,195,414, issued April 2, 1940); or Serial No. 84,787, filed June 12, 1936 (Patent No. 2,163,599, issued June 27, 1939); or in U. S. Patent No. 2,078,947, issued to myself and Raymond C. Lassiat on May 4, 1937.

It will be apparent from the above that the present invention provides a definite and valuable step forward in the art of purifying lower boiling hydrocarbons. The process disclosed and claimed herein is one which possesses advantages of great importance to the refiner, including simplicity and economy. It accomplishes substantial reduction of the sulphur content of naphthas without substantial reduction in yield of the end product. Moreover, it simultaneously effects substantial improvement of other properties of naphthas which have direct and important bearing on the market value of the same.

I claim as my invention:

1. The process of treating naphtha containing organic sulphur bearing and unstable gum and color forming components to selectively transform and remove such substances therefrom so as to produce a sweet and stable refined product having substantially the boiling range of the naphtha charge without depreciating sweet and stable components thereof comprising the steps of subjecting such a charge substantially free of higher boiling hydrocarbons at temperature suitable for cracking of sweet and stable components thereof to the action of an active cracking catalyst comprised essentially of a blend of silica and alumina in the weight ratio of at least about 4:1 while feeding the naphtha to said catalyst at such high rate that the action of the latter is selective and limited substantially solely to transformation of the sulphur content of said organic sulphur bearing components into a form easily removed from the naphtha and to polymerization of unstable gum and color forming components, subjecting the thus partially treated naphtha at reduced temperature not in excess of about 650° F. to the action of a polymerizing and desulphurizing catalyst comprising a desulphurizing metal incorporated with an adsorptive polymerizing agent to remove said transformed sulphur components and to effect further polymerization of gum and color forming components of the naphtha, and removing polymers from the resulting product to yield a sweet and stable refined product of substantially the boiling range of the charge.

2. In removing organically bound sulphur and unstable gum and color forming components from naphthas containing such substances so as to obtain sweet and stable refined products having substantially the boiling range of the charge without depreciating sweet and stable components thereof the steps of subjecting such a naphtha charge to the action of an active cracking catalyst comprised essentially of silica and alumina in the weight ratio of at least about 4:1 maintained at temperature of at least 750° F. suitable for cracking sweet and stable components of the naptha while feeding the latter to said catalyst at such high rate that the action of the catalyst is selective and is limited substantially solely to transformation of said organically bound sulphur into a form easily removed from the naphtha and to polymerization of unstable gum and color forming components, subjecting the thus treated naphtha at reduced temperature not in excess of about 650° F. to the action of a polymerizing and desulphurizing contact mass comprising a desulphurizing metal distributed on an adsorptive silicious polymerization catalyst to remove said transformed sulphur and to effect further polymerization of gum and color forming components of the naphtha, and removing polymers from the finished naphtha to yield a sweet and stable refined product of substantially the boiling range of the charge.

3. In the production of sweet and stable naphthas the process of selectively transforming and removing organic sulphur bearing and unstable gum and color forming components from a naphtha charge having substantially the boiling range of the desired refined product and containing such components without depreciating sweet and stable components thereof comprising the steps of subjecting said charge at temperature within the range of 800 to 875° F. to the action of an active catalyst capable of promoting cracking of said sweet and stable components at the selected temperature and comprised essentially of silica and alumina in the weight ratio of at least about 4:1 while feeding the naphtha to said catalyst at such high rate that the effectiveness of the catalyst is limited substantially to selective transformation of said sulphur bearing components into easily removable form and polymerization of unstable gum and color forming components, subjecting the thus treated naphtha at reduced temperature within the range of 400 to 650° F. to the action of a second catalyst comprising a desulphurizing metal incorporated with an adsorptive blend of silica and alumina to effect further polymerization of gum and color forming components of the naphtha, and removing polymers from the finished naphtha to yield a sweet and stable refined product of substantially the boiling range of the charge.

4. In the production of sweet and stable naphthas the process of selectively transforming and removing organic sulphur bearing and unstable gum and color forming components from a naphtha charge having substantially the boiling range of the desired refined product and containing such components without depreciating sweet and stable components thereof comprising the steps of subjecting said charge at temperature within the range of 800 to 875° F. to the action of an active catalyst capable of promoting cracking of said sweet and stable components at the selected temperature and comprised essentially of silica and alumina in the weight ratio of at least about 4:1 while feeding the naphtha to said catalyst at such high rate that the effectiveness of the catalyst is limited substantially to selective transformation of said sulphur bearing components into easily removable form and polymerization of unstable gum and color forming components, subjecting the thus treated naphtha to the action of a second contact mass comprising up to 20% by weight of a metal from the group consisting of Ni, Cu, Co uniformly dispersed in oxide form through a support of an adsorptive blend of silica and alumina also in the weight ratio of at least 4:1 and maintained in temperature at about 600° F. to remove said easily removable sulphur while simultaneously effecting further polymerization of gum and color forming components, and removing polymers from the products of the second catalytic treatment to yield a sweet and stable finished naphtha of substantially unchanged boiling range.

EUGENE J. HOUDRY.